(12) United States Patent
Arora et al.

(10) Patent No.: US 9,235,520 B2
(45) Date of Patent: Jan. 12, 2016

(54) PROTOCOL FOR CONFLICTING MEMORY TRANSACTIONS

(75) Inventors: Manoj K. Arora, Bangalore (IN);
Robert G. Blankenship, Tacoma, WA (US); Rahul Pal, Bangalore (IN);
Dheemanth Nagaraj, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 128 days.

(21) Appl. No.: 13/997,900

(22) PCT Filed: Dec. 20, 2011

(86) PCT No.: PCT/US2011/066190
§ 371 (c)(1),
(2), (4) Date: Jun. 25, 2013

(87) PCT Pub. No.: WO2013/095388
PCT Pub. Date: Jun. 27, 2013

(65) Prior Publication Data
US 2014/0359230 A1 Dec. 4, 2014

(51) Int. Cl.
*G06F 12/00* (2006.01)
*G06F 12/08* (2006.01)
*G06F 13/14* (2006.01)
*G06F 13/38* (2006.01)

(52) U.S. Cl.
CPC ........ *G06F 12/0815* (2013.01); *G06F 12/0831* (2013.01); *G06F 13/14* (2013.01); *G06F 13/38* (2013.01); *G06F 12/0824* (2013.01); *G06F 12/0828* (2013.01)

(58) Field of Classification Search
None
See application file for complete search history.

(56) References Cited

U.S. PATENT DOCUMENTS

| | | | |
|---|---|---|---|
| 2008/0005487 A1 | 1/2008 | Hum et al. | |
| 2008/0126750 A1 | 5/2008 | Sistla | |
| 2009/0113139 A1 | 4/2009 | Pudipeddi et al. | |
| 2010/0005246 A1 | 1/2010 | Beers et al. | |
| 2010/0332767 A1 | 12/2010 | Kumar et al. | |

OTHER PUBLICATIONS

International Preliminary Report on Patentability for PCT International Application No. PCT/US2011/066190, mailed Jul. 3, 2014, 6 pages.
"PCT, International Search Report of the International Searching Authority for Int'l Application No. PCT/US2011/066190", (Sep. 14, 2012), Whole Document.

*Primary Examiner* — Duc Doan
(74) *Attorney, Agent, or Firm* — Blakely, Sokoloff, Taylor & Zafman LLP

(57) ABSTRACT

Embodiments of the invention describe a cache coherency protocol that eliminates the need for ordering between message classes and also eliminates home tracker preallocation. Embodiments of the invention describe a less complex conflict detection and resolution mechanism (at the home agent) without any performance degradation in form of bandwidth or latency compared to prior art solutions.

Embodiments of the invention describe a home agent that may receive request messages, e.g., data ownership request messages and data request messages, which include issuance data indicating an order of the respective message issued. Said home agent may determine whether an early or late conflict exists based, at least in part, on a received conflict response message and the issuance data of a most recent completed transaction.

20 Claims, 6 Drawing Sheets

PROTOCOL FOR CONFLICTING MEMORY TRANSACTIONS

CLAIM OF PRIORITY

This application is a U.S. National Phase application under 35 U.S.C. §371 of International Application No. PCT/US2011/066190, filed Dec. 20, 2011, entitled "PROTOCOL FOR CONFLICTING MEMORY TRANSACTIONS," the entire contents of which are incorporated herein by reference.

FIELD

Embodiments of the invention generally pertain to computing devices and more particularly to memory transaction management.

BACKGROUND

Computer systems typically include one or more processors or processing cores. These processors/cores are operatively coupled to other system components such as memory controllers, input/output hubs, and mass storage via some form of hardware connections, e.g., interconnects.

A communication protocol may be used to enable communication between these system components. Many such protocols provide for different layers to handle communication tasks. In some protocols, a physical layer is the layer that transmits messages along an interconnect and receives and processes messages from a corresponding physical layer of one or more other devices. Said physical layer may be coupled to a link layer that performs various functions such as error detection and correction. Said link layer may be coupled to a protocol layer which receives message packets from the link layer and further process them to route them to their appropriate destination locations.

An example protocol for use with a link as described above is the QuickPath Interconnect (QPI) protocol which is for point-to-point interconnects and provides for a multi-layer communication protocol for communication between various system devices such as processor cores, chipsets and so forth.

Each of the above described processors/cores may have an associated cache memory. Cache memory in computer systems may be kept coherent by managing transactions for memory addresses associated with particular locations in the system. Thus, a system's efficiency is directly related to how it manages the conflicts that arise amongst the different caches.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention describe a cache coherency protocol that eliminates the need for ordering message classes and also eliminates home tracker preallocation. Embodiments of the invention describe a less complex conflict detection and resolution mechanism (at the home agent) without any performance degradation in the form of bandwidth or latency compared to prior art solutions.

Figure 1A:
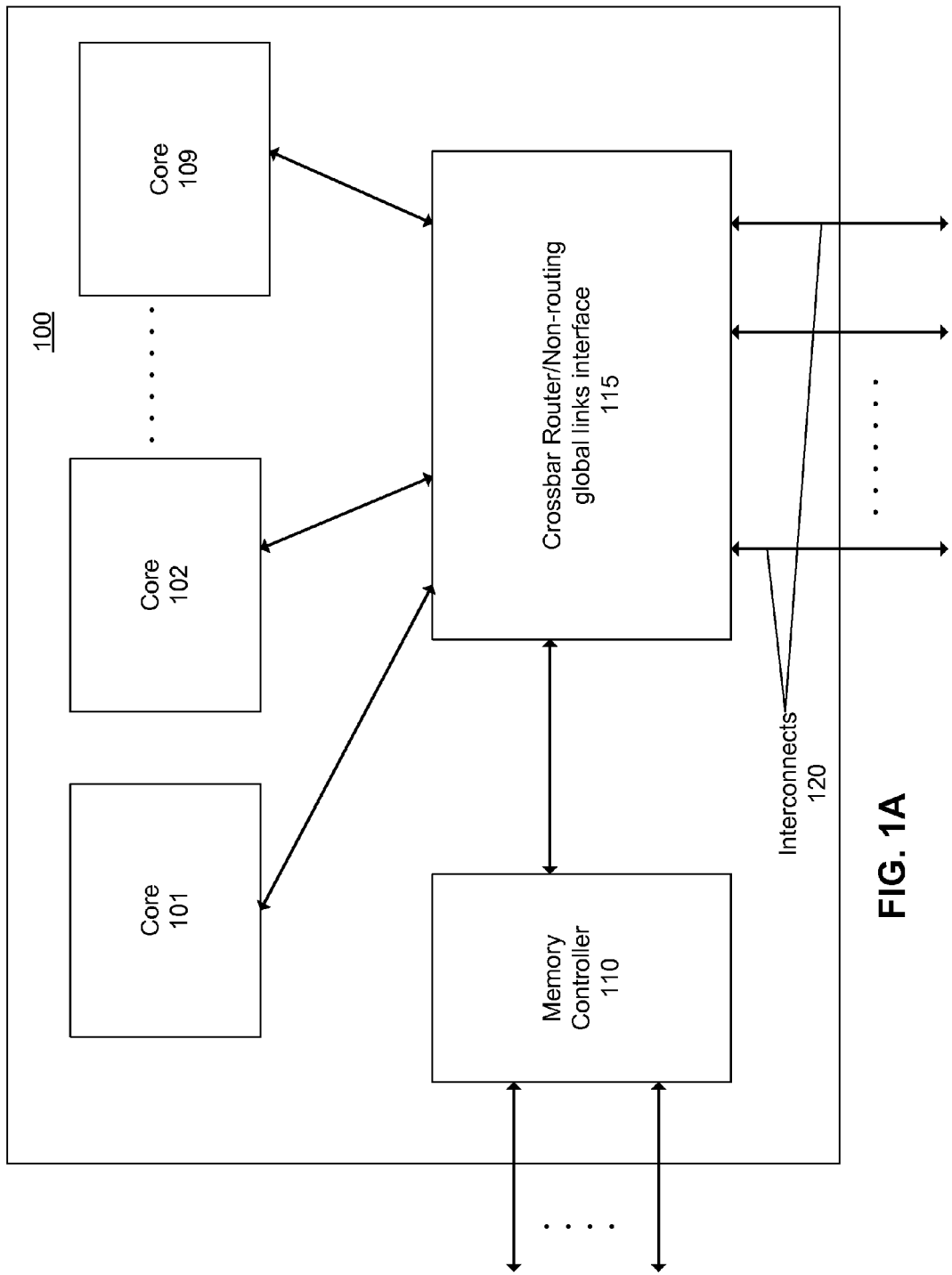
FIG. 1A is a block diagram of a multi-core processor utilizing an embodiment of the invention.

FIG. 1 is a block diagram of a multi-core processor utilizing an embodiment of the invention. In this embodiment, processor 100 includes cores 101, 102 . . . 109. In some embodiments, each of said cores have separate caches, while in other embodiments said cores share the same cache. Processor 100 may also include integrated memory controller 110 to provide access for cores 101-109 to system memory.

In this embodiment, processor 100 includes integrated crossbar router/non-routing global interface 115 to manage connecting the processor to interconnects 120. The physical connectivity of each of interconnect links 120 may comprise differential signal pairs plus a differential forwarded clock. Each port supports a link pair of uni-directional links to complete the connection between two system components (e.g., processor 100 and another system component). This supports traffic in both directions simultaneously. Said system interconnect may be thought of as comprising five layers: physical, link, routing, transport, and protocol.

The physical layer may comprise the actual wires carrying the signals, as well as circuitry and logic to support ancillary features required in the transmission and receipt of bit data. The link layer may describe the layer responsible for reliable transmission and flow control. The routing layer may provide the framework for directing packets through the fabric. The transport layer may be an architecturally defined layer providing advanced routing capability for reliable end-to-end transmission. The protocol layer may comprise a high-level set of rules for exchanging packets of data between devices.

Said system interconnect utilized by processor 100 may further include a cache coherency protocol to keep the distributed memory and caching structures coherent during system operation. It may support both low-latency source snooping and a scalable home snoop behavior. The coherency protocol provides for direct cache-to-cache transfers for optimal latency.

In embodiments of the invention, said coherency protocol may include two distinct types of agents: caching agents and home agents. Thus, processor 100 may have both types of agents and, in some embodiments, multiple agents of each type.

A caching agent as referred to herein describes a module or logic which may initiate transactions into coherent memory, and may retain copies in its own cache structure. A caching agent may also provide copies of the coherent memory contents to other caching agents.

A home agent as referred to herein describes a module or logic which may service coherent transactions, including handshaking as necessary with caching agents. A home agent supervises a portion of the coherent memory. In some embodiments, home agent modules/logic are not included in the memory controller circuits for main memory, but rather additional interconnect logic which maintains the coherency for a given address space. Said home agent may also be responsible for managing the conflicts that might arise among the different caching agents. It provides the appropriate data and ownership responses as required by a given transaction's flow.

Figure 2:
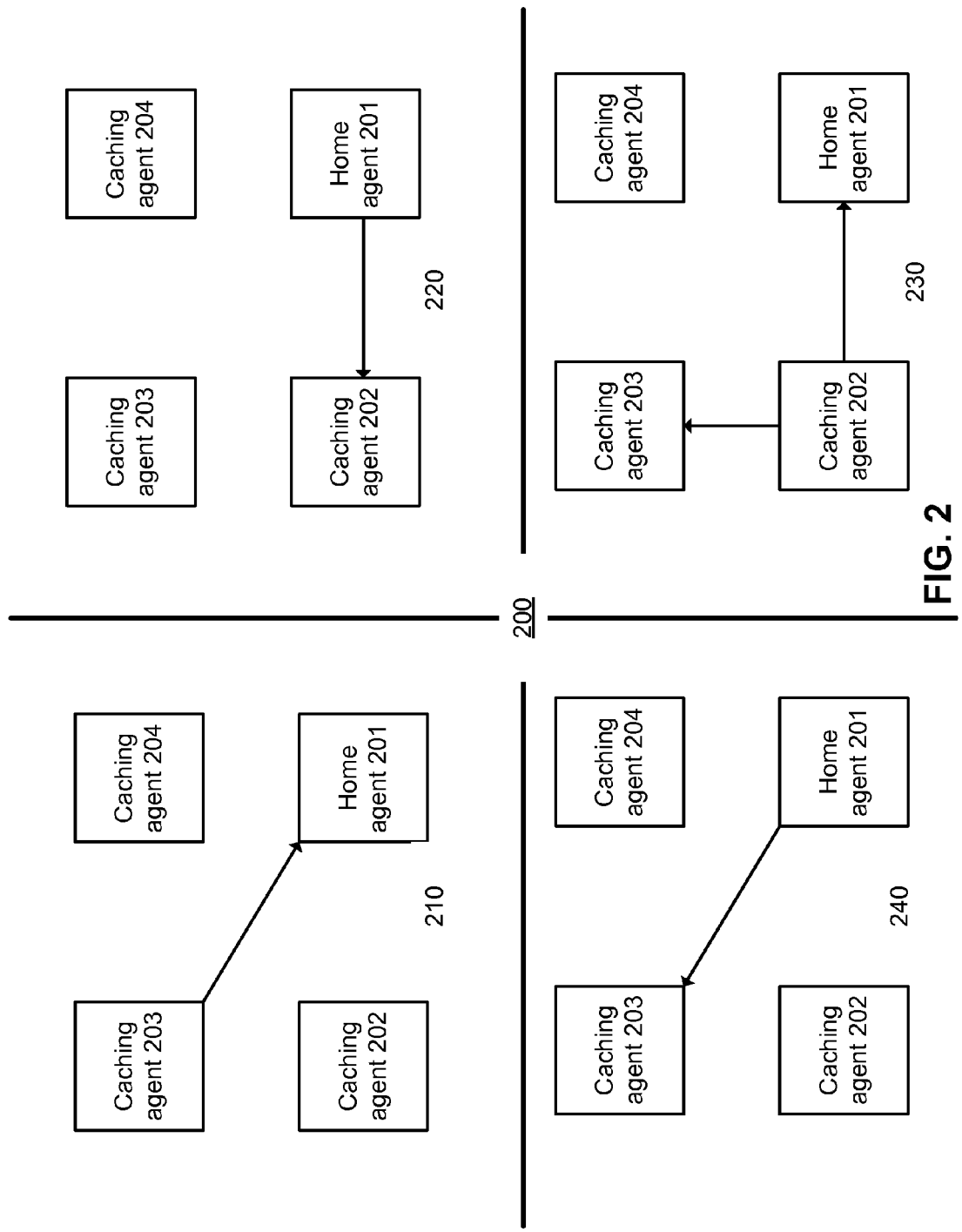
FIG. 2 is a flow diagram describing coherency behavior according to an embodiment of the invention.

FIG. 2 is a flow diagram describing coherency behavior according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Home snoop coherency behavior is shown in general in process 200. Said home snoop coherency behavior defines the home agent as responsible for the snooping of other caching agents. In this example, home agent 201 and caching agents 202, 203 and 204 may each be different processors or processing cores of a system.

In this example, operation 210 is shown as caching agent 203 issuing a request to home agent 201 for contents of a memory location supervised by the home agent. In response to receiving this request, home agent 201 may access its directory structure to target a snoop to the caching agent that may have a copy of the memory in question; In this example, caching agent 202 has a copy of the memory, and thus home agent 201 issues a snoop message to caching agent 202 as shown in operation 220.

In operation 230, caching agent 202 responds back to home agent 201 with the status of the address (e.g., whether the contents of the memory address have been modified). In this example, the processor acting as caching agent 202 has a copy of the line in the proper state, so the data is delivered directly to requesting cache agent 203, as shown in operation 230.

Home agent 201 resolves any conflicts, and if necessary, returns the data to original requesting cache agent 203. In some embodiments, home agent 201 only returns data to the original requesting cache agent after first checking to see if data was delivered by another caching agent (e.g., as shown in operation 230) and completes the transaction, as shown in operation 240.

The above described home snoop behavior implementation typically includes a directory structure to target the snoop to the specific caching agents that may have a copy of the data. This has the effect of reducing the number of snoops and snoop responses that the home agent has to deal with on the interconnect fabric.

In embodiments of the invention, the home agent may consider two types of conflicts. An early conflict is a type of conflict where the conflicting caching agent does not yet have a copy of the requested cache line. The second type of conflict may be referred to as a late conflict (or alternatively as a true conflict). In such a conflict, the caching agent providing the conflict response has been sent the latest copy of the requested cache line by home agent (Data/CMP is in flight to Caching agent). In this scenario, the home agent may send a second (follow-up) snoop to extract the most recent copy of the line.

Prior art solutions require the home agent to track the ordering between the cache line request and the above described snoop message response in order to determine whether a conflict is an early conflict or a late conflict, thereby causing additional processing and system resources to be used. Embodiments of the invention utilizing a messaging structure and protocol to eliminate ordering operations and require minimal tracking between the Caching agent and the Home agent.

Figure 3A:
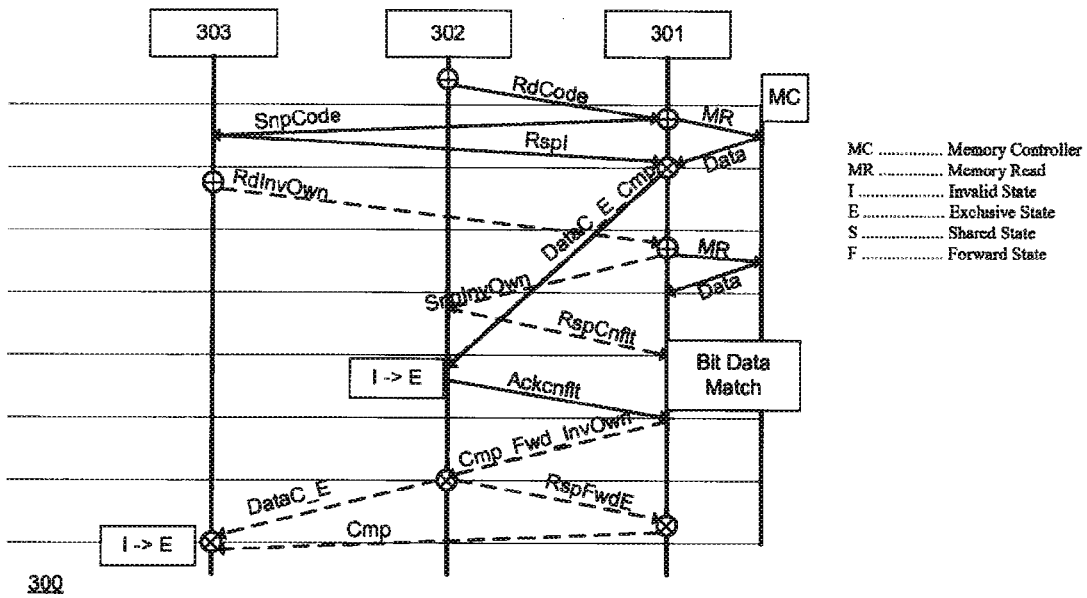
FIG. 3A and FIG. 3B are line graphs illustrating conflict resolution scenarios according to an embodiments of the invention.
Figure 3B:
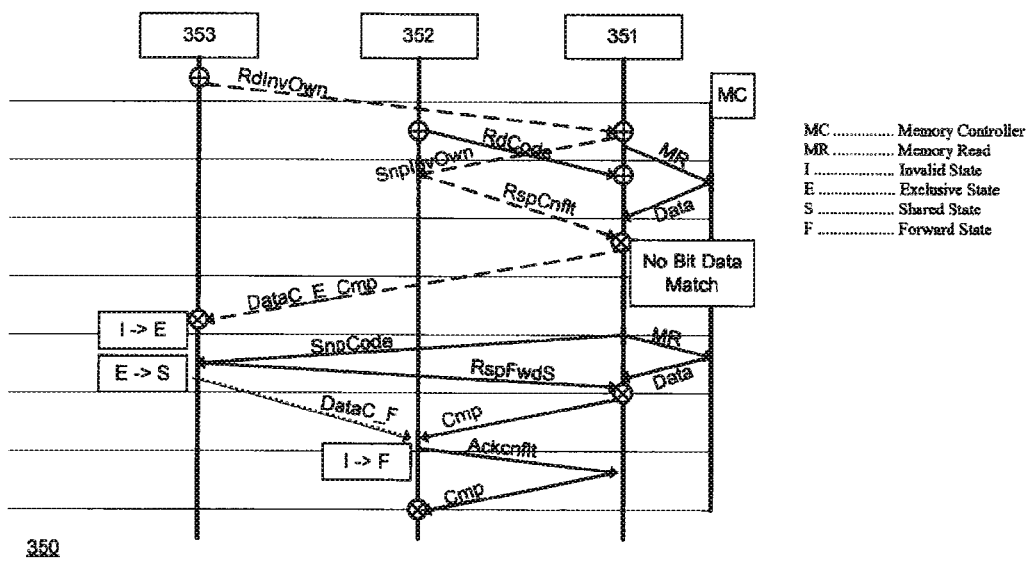

FIG. 3A and FIG. 3B are line graphs illustrating conflict resolution scenarios according to an embodiments of the invention. FIG. 3A illustrates the detection of a late conflict utilizing message structures according to an embodiment of the invention. In this example, caching agent 302 is shown to issue a read access request (RdCode) to home agent 301 for a cache line supervised by the home agent. Caching agent 303 has a copy of the cache line requested by caching agent 302, and thus home agent 301 issues a snoop message (SnpCode) to caching agent 303. Home agent sends the cache line in a data packet (DataC_E_Cmp) to caching agent 302.

Caching agent 303 may send an invalid response to home agent 301 (RspI), indicating that the cache line in memory is current and caching agent 303 doesn't have the line). Caching agent 303 may further send a read for ownership request (RdInvOwn) for the cache line to home agent 301. The home agent sends a snoop to invalidate the current owner (SnpInvOwn) request to caching agent 302 on behalf of the RdInvOwn message from caching agent 303.

Caching agent 302 responds with a conflict response (RspCnflt) because from, its perspective, its RdCode request has still not been completed, as it has yet to receive the cache line from home agent 301.

In this example, the above conflict may be described as a late conflict. In this embodiment, each of the above described messages includes issuance data indicating an order in which the respective message issued. For example, the issuance data may comprise a sequence number, where the sequence number is incremented by the caching agents in response to each new data request message including the transaction identifier being issued from one of the caching agents. In another example, said issuance data may comprise bit data to be toggled by the caching agents in response to a new data request message including the transaction identifier being issued from one of the caching agents. In another example, said issuance data may be based on variables available in request and response messages that are unique to an outstanding transaction (e.g., address bits). Any other variations of issuance data that allow implicit determination of order by home and caching agents without sending any extra information may also be used.

In this example, said issuance data is the above described bit data, toggled between a '0' state (represented by solid lines in line graph 300) and a '1' state (represented by dashed lines in line graph 300). In this embodiment, if the bit data of the RspCnflt message is the same as the bit data of the last issued transaction (in this example, the RdInvOwn message), then it is determined that a late conflict exists. In other embodiments, matching bit data may indicate an early conflict.

Caching agent 302 acknowledges the conflict, and home agent 301 sends the caching agent a message to invalidate its copy of the cache line (Cmp_Fwd_InvOwn). Caching agent 302 sends RspFwdE to the Home Agent, and caching agent 302 sends this data to caching agent 303 (DataC_E).

Figure 6:
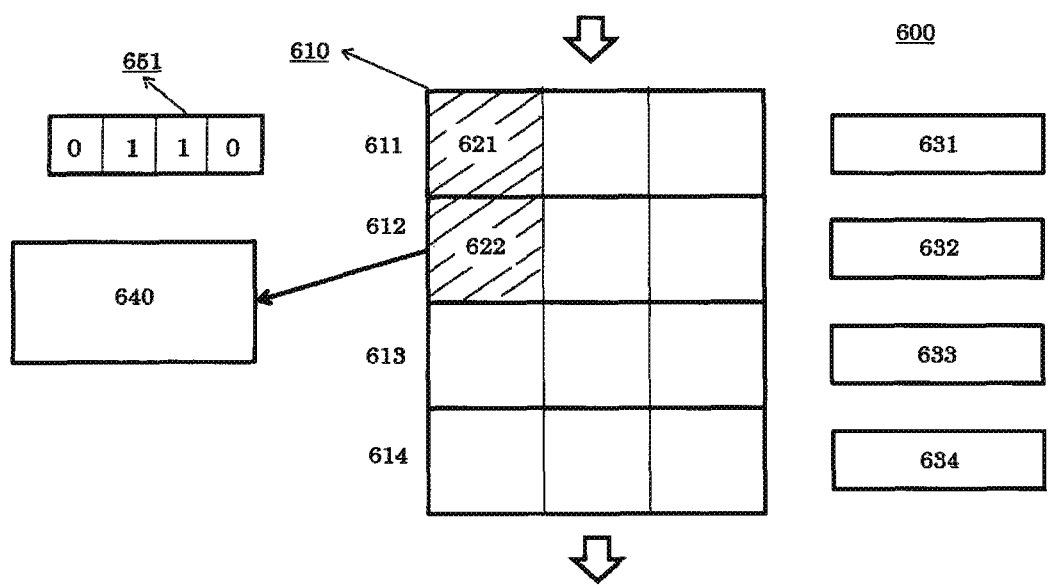
FIG. 6 is a block diagram of a home agent using a RTID History Queue (RHQ) to track issuance data for completed transaction according to an embodiment of the invention.

Thus, in some embodiments of the invention, caching agents ensure that two subsequent transactions from any two caching agents to the home agent (with same request transaction ID (RTID)) are originated with different issuance data. As shown in FIG. 6, the home agent may have an RTID History Queue (RHQ) 610 to track the issuance data 651 for completed transactions. In one embodiment, the RHQ 610 is preallocated for all requestors in the system and has one entry 621 per RTID 631 and stores the issuance data 651 of the transaction determined at request completion. RspCnflt messages from caching agents to home agents may implicitly or explicitly carry the issuance data at the respective caching agent; if this issuance data 651 matches with the corresponding RHQ entry 621 then it is a late conflict, otherwise it is an early conflict (e.g., as shown in FIG. 3B and described below).

FIG. 3B illustrates the detection of an early conflict utilizing message structures according to an embodiment of the invention. As shown in line graph 350, caching agent 353 sends a read for ownership request (RdInvOwn) to home agent 351 for a cache line supervised by the home agent. Caching agent 352 is shown to subsequently issue a read access request (RdCode) to home agent 351 for the cache line.

Home agent 351 sends a snoop to invalidate the current owner (SnpInvOwn) to caching agent 352 on behalf of the RdInvOwn message from caching agent 353. Caching agent 352 responds with a conflict response (RspCnflt) because from, its perspective, its RdCode request has still not been completed as it has yet to receive the requested cache line from home agent 351.

In this example, the above conflict may be described as an early conflict. As described above, each of the above described messages includes issuance data indicating an order of the respective message issued. In this example, said issuance data is the above described bit data, toggled between a '0' state (represented by solid lines in line graph 350) and a '1' state (represented by dashed lines in line graph 350) In this embodiment, if the bit data of the RspCnflt message differs from the bit data of the last issued transaction (in this example, the RdCode message), then it is determined that an early conflict exists.

Home agent 351 sends the cache line in a data packet (DataC_E_Cmp) to caching agent 353, and subsequently a snoop message (SnpCode) to caching agent 353 on behalf of the RdCode issued by caching agent 352. Caching agent 353 responds to the snoop request with a current version of the cache line (RspFwdS), and also sends the cache line to caching agent 352 to fulfill the RdCode request. Caching agent 352 and home agent 351 acknowledges the resolution of the conflict, and the completion of the RdCode request.

Thus, in the embodiments illustrated in FIG. 3A and FIG. 3B, the determination of an early or late conflict is based the on arrival of the RspCnflt message itself. Issuance data is passed along with the RspCnflt message to the home agent. By comparing this issuance data with the issuance data of the last completed transaction (for a given RTID), the home agent detects whether it is an early or late conflict.

Therefore, home snoop protocols according to embodiments of the invention remove the requirement of home channel ordering (i.e., ordering between request and snoop response message) and home preallocation (i.e., guaranteed sinking of request to the home agent), which prior art solutions require in order to distinguish late versus early conflicts. Furthermore, embodiments of the invention do not require any extra messaging in a non-conflict scenario.

In some embodiments of the invention, the above described snoop response message class is separate from the request message class as a means to avoid deadlock. If snoop responses share the same message class with requests then it is possible that a request waits for a snoop response that is stuck behind a conflicting request; since embodiments of the invention eliminate home preallocation (i.e., guaranteed sinking of all requests) the home agent is not able to sink the conflicting request and may result in a deadlock.

In one embodiment, as shown in FIG. 6, a conflict resolution process is utilized wherein RHQ 610 has two additional fields: a latecnflt_bit and a pointer to the Home Tracker (HT) 640. Ackcnflt messages may belong to a separate class to enable sinking in the RHQ 610. The latecnflt_bit in RHQ may be set if the issuance data 651 associated with the respective RspCnflt message matches corresponding RHQ entry 621 or if Ackcnflt message arrives before the RspCnflt message. If Ackcnflt or RspCnflt is received with latecnflt_bit set, the home agent may send CMP_FWD*. The home agent sends CMP* for Ackcnflt corresponding to early conflicts. Late conflicts may be determined based on requestor NID/RTID in a RspCnflt message, which may also be stored as pointer to a Home Tracker (HT) 640 in the RHQ 610.

Figures 4A, 4B:
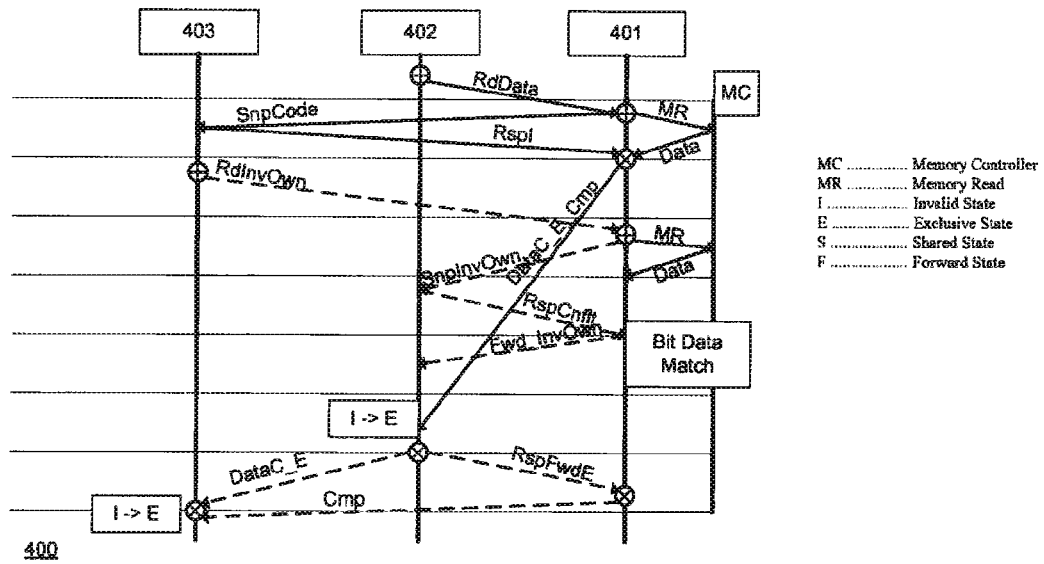
FIG. 4A and FIG. 4B are line graphs illustrating conflict resolution scenarios according to an embodiments of the invention.

FIG. 4A and FIG. 4B are line graphs illustrating conflict resolution scenarios according to an embodiments of the invention. The conflict scenario shown in line graph 400 of FIG. 4A is similar to that of line graph 300 of FIG. 3A, and thus, the requests shown in this graph are not described in detail; however, in this example, home agent 401 forwards either a Fwd or a FwdEarly message in response to the conflict response (RspCnflt) sent from caching agent 402 (which was sent in response to the RdInvOwn request from caching agent 403)—i.e., home agent 401 sends one of a Fwd message and a FwdEarly message in response to a late conflict and an early conflict, respectively.

Similar to the embodiment illustrated in FIG. 3A, if the bit data of the RspCnflt message is the same as the bit data of the last issued transaction (in this example, the RdInvOwn message), then it is determined that a late conflict exists, and thus home agent 401 sends a Fwd message (i.e., a Fwd_InvOwn message) to caching agent 402.

The conflicts shown in line graph 450 of FIG. 4B are similar to that of line graph 350 of FIG. 3B (and thus, the requests shown in this graph are not described in detail)— caching agent 453 sends a read for ownership request (RdInvOwn) to home agent 451 for a cache line supervised by the home agent; caching agent 452 is shown to subsequently issue a read access request (RdCode) to home agent 451 for the cache line.

Similar to FIG. 4A, the determination of an early or late conflict is based on if the bit data of the RspCnflt message is the same as the bit data of the last issued transaction. Thus, since the bit data of the RspCnflt message differs from the bit data of the last issued transaction (in this example, the RdCode message), then it is determined that an early conflict exists and home agent 451 sends a FwdEarly message to caching agent 452.

Figure 5:
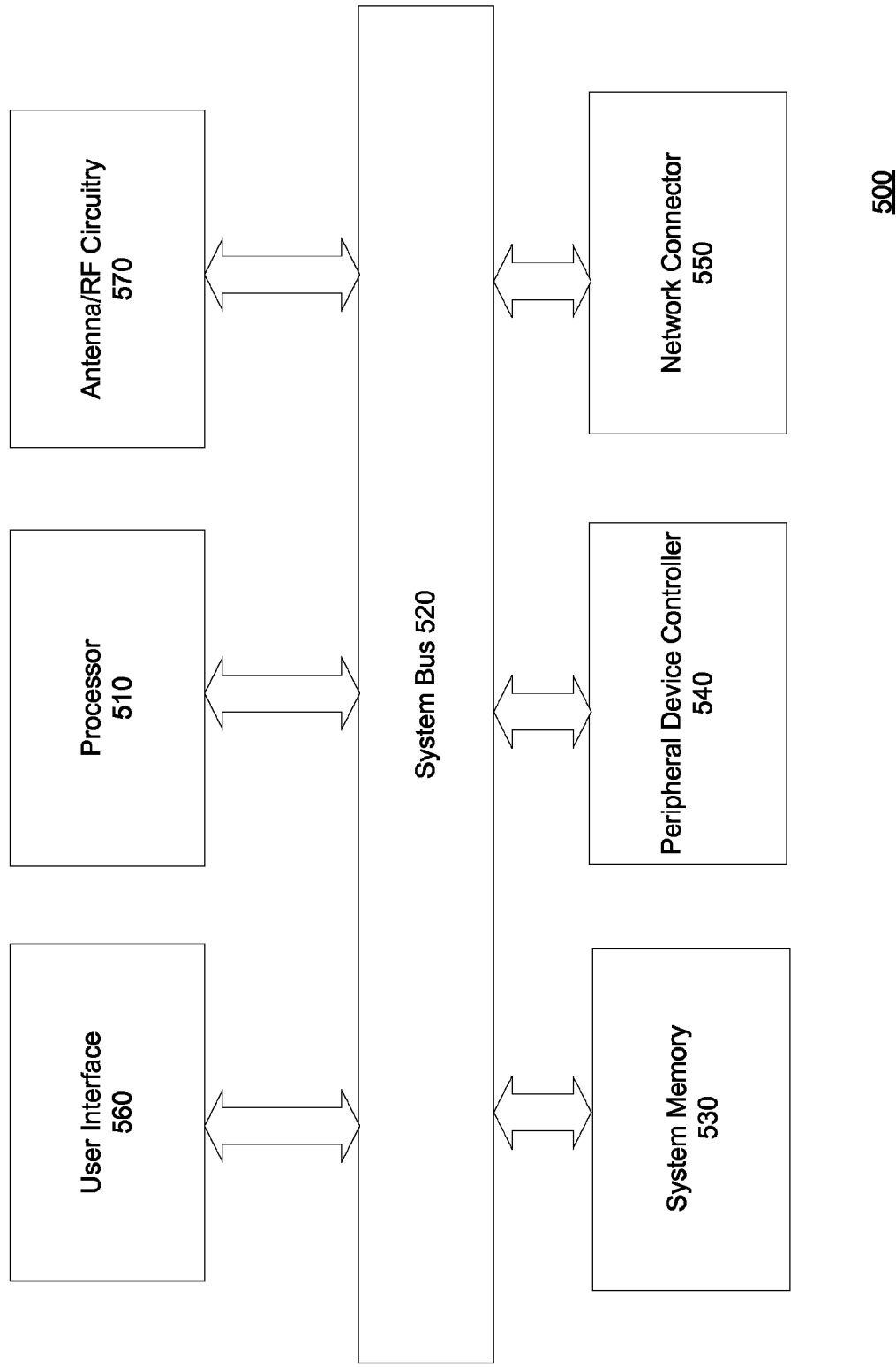
FIG. 5 is block diagram of a system that may utilize an embodiment of the invention.

FIG. 5 is block diagram of a system that may utilize an embodiment of the invention. System 500 may describe a server platform, or may be included in, for example, a desktop computer, a laptop computer, a tablet computer, a netbook, a notebook computer, a personal digital assistant (PDA), a server, a workstation, a cellular telephone, a mobile computing device, an Internet appliance, an MP3 or media player or any other type of computing device.

System 500 may include processor 510 to exchange data, via system bus 520, with user interface 560, system memory 530, peripheral device controller 540 and network connector 550. Processor 510 may be a plurality of processors and/or a plurality of processing cores that execute the messaging structure and protocol described above in order to differentiate between early and late memory request conflicts, and thus eliminate the extraneous tracking and ordering operations of the prior art.

System 500 may further include antenna and RF circuitry 570 to send and receive signals to be processed by the various elements of system 500. The above described antenna may be a directional antenna or an omni-directional antenna. As used herein, the term omni-directional antenna refers to any antenna having a substantially uniform pattern in at least one plane. For example, in some embodiments, said antenna may be an omni-directional antenna such as a dipole antenna, or a quarter wave antenna. Also for example, in some embodiments, said antenna may be a directional antenna such as a parabolic dish antenna, a patch antenna, or a Yagi antenna. In some embodiments, system 500 may include multiple physical antennas.

While shown to be separate from network connector 550, it is to be understood that in other embodiments, antenna and RF circuitry 570 may comprise a wireless interface to operate in accordance with, but not limited to, the IEEE 802.11 standard and its related family, Home Plug AV (HPAV), Ultra Wide Band (UWB), Bluetooth, WiMax, or any other form of wireless communication protocol.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The invention claimed is:
1. An apparatus comprising:
a processor including a plurality of cores;
first and second caching agents each executed via one of the processor cores; and
a home agent executed via one of the processor cores, the home agent to:
receive a data request message, for contents of a memory location, from the first caching agent and including a transaction identifier;
receive a data ownership request message, for the contents of the memory location, from the second caching agent and including the transaction identifier, wherein the data ownership request message and the data request message each further include issuance data indicating an order of the respective message issued;
send an invalidating snoop message to the first caching agent in response to receiving the data ownership message and the data request message for the memory location;
receive a conflict response message from the first caching agent; and
determine whether the first caching agent includes a copy of the contents of the memory location based, at least in part, on the conflict response message and the issuance data of a most recent completed transaction for the transaction identifier.

2. The apparatus of claim 1, wherein the invalidating snoop message is included in a different message class than data request messages from the first and second caching agents.

3. The apparatus of claim 1, the home agent to further:
in response to determining the first caching agent includes a copy of the contents of the memory location, send an invalidation and conflict complete message to the first caching agent.

4. The apparatus of claim 1, the home agent to further:
in response to determining the first caching agent does not include a copy of the contents of the memory location, send a conflict complete message to the first caching agent.

5. The apparatus of claim 1, wherein the issuance data comprises a sequence number to be incremented by first and second caching agents in response to a data request message including the transaction identifier being issued from one of the caching agents.

6. The apparatus of claim 1, wherein the issuance data comprises bit data to be toggled by first and second caching agents in response to a data request message including the transaction identifier being issued from one of the caching agents.

7. A method comprising:
receiving a data request message, for contents of a memory location, from a first caching agent and including a transaction identifier;
receiving a data ownership request message, for the contents of the memory location, from a second caching agent and including the transaction identifier, wherein the data ownership request message and the data request message each further include issuance data indicating an order of the respective message issued;
sending an invalidating snoop message to the first caching agent in response to receiving the data ownership message and the data request message for the memory location;
receiving a conflict response message from the first caching agent; and
determining whether the first caching agent includes a copy of the contents of the memory location based, at least in part, on the conflict response message and the issuance data of a most recent completed transaction for the transaction identifier.

8. The method of claim 7, wherein the invalidating snoop message is included in a different message class than data request messages from the first and second caching agents.

9. The method of claim 7, further comprising:
in response to determining the first caching agent includes a copy of the contents of the memory location, sending an invalidation and conflict complete message to the first caching agent.

10. The method of claim 7, further comprising:
in response to determining the first caching agent does not include a copy of the contents of the memory location, sending a conflict complete message to the first caching agent.

11. The method of claim 7, wherein the issuance data comprises a sequence number to be incremented by first and second caching agents in response to a data request message including the transaction identifier being issued from one of the caching agents.

12. The method of claim 7, wherein the issuance data comprises bit data to be toggled by first and second caching agents in response to a data request message including the transaction identifier being issued from one of the caching agents.

13. A system comprising:
a plurality of processors;
a memory;
first and second caching agents included in one of the processors; and
a home agent included in one of the processors, the home agent to:
receive a data request message, for contents of the memory, from the first caching agent and including a transaction identifier;
receive a data ownership request message, for the contents the memory, from the second caching agent and including the transaction identifier, wherein the data ownership request message and the data request message each further include issuance data indicating an order of the respective message issued;
send an invalidating snoop message to the first caching agent in response to receiving the data ownership message and the data request message for the contents of the memory;
receive a conflict response message from the first caching agent; and
determine whether the first caching agent includes a copy of the contents of the memory based, at least in part, on the conflict response message and the issuance data of a most recent completed transaction for the transaction identifier.

14. The system of claim 13, wherein the invalidating snoop message is included in a different message class than data request messages from the first and second caching agents.

15. The system of claim 13, the home agent to further:
in response to determining the first caching agent includes a copy of the contents of the memory, send an invalidation and conflict complete message to the first caching agent.

16. The system of claim 13, the home agent to further:
in response to determining the first caching agent does not include a copy of the contents of the memory, send a conflict complete message to the first caching agent.

17. The system of claim 13, wherein the issuance data comprises a sequence number to be incremented by first and second caching agents in response to a data request message including the transaction identifier being issued from one of the caching agents.

18. The system of claim 13, wherein the issuance data comprises bit data to be toggled by first and second caching agents in response to a data request message including the transaction identifier being issued from one of the caching agents.

19. The system of claim 13, wherein each of the plurality of processors comprises a processing core included in a multi-core processor.

20. The system of claim 13, further comprising:
an antenna; and
radio frequency circuitry coupled to the antenna to receive signal data to be processed by the system.

* * * * *